No. 847,995. PATENTED MAR. 19, 1907.
J. E. CARROLL.
GAS DEMONSTRATION APPARATUS.
APPLICATION FILED FEB. 9, 1907.

Inventor
John E. Carroll

Witnesses
T. L. Mocham
H. G. Keithley

By Perford M. Smith
Attorney

UNITED STATES PATENT OFFICE.

JOHN E. CARROLL, OF PHILADELPHIA, PENNSYLVANIA.

GAS-DEMONSTRATION APPARATUS.

No. 847,995.  Specification of Letters Patent.  Patented March 19, 1907.

Application filed February 9, 1907. Serial No. 356,638.

*To all whom it may concern:*

Be it known that I, JOHN E. CARROLL, a citizen of the United States, residing at Philadelphia, in the county of Philadelphia and State of Pennsylvania, have invented a certain new and useful Gas-Demonstration Apparatus, of which the following is a specification, reference being had therein to the accompanying drawing.

This invention relates to gas-demonstration apparatus, the object of the present invention being to produce a pipe or conduit for gas which will protect the gas passing therethrough from freezing by the exclusion of atmospheric temperature from the inside of the pipe or conduit, preventing the precipitation of moisture on the outer surface of the pipe or conduit.

The pipe or conduit hereinafter particularly described is especially adapted for carbonic-acid gas, which will ordinarily freeze in its passage through the usual piping, being also equally well adapted for other highly-volatile liquids.

With the above and other objects in view, the nature of which will more fully appear as the description proceeds, the invention consists in the novel construction, combination, and arrangement herein fully described, illustrated, and claimed.

Figure 1:
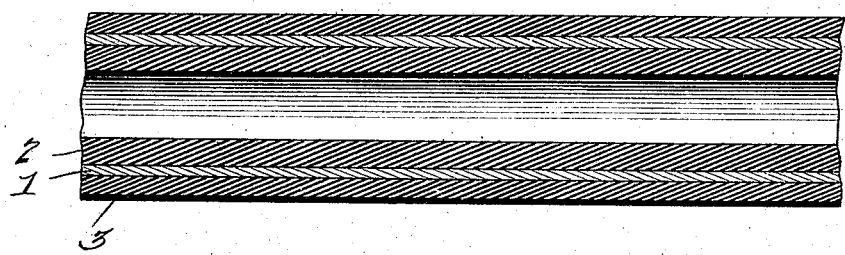
Figure 2:
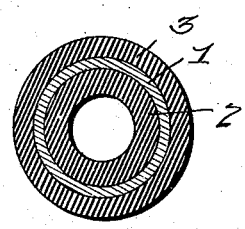

In the accompanying drawings, Figure 1 is a longitudinal section through a pipe or conduit embodying the present invention. Fig. 2 is a cross-section through the same.

The conduit contemplated in this invention comprises a pipe 1, of metal, which pipe may be of any desired size and gage or thickness and of any length.

In carrying out the present invention the said pipe is provided with an insulating-lining 2, of fiber, which under the preferred embodiment of this invention is vulcanized. For example, said fibrous lining may be composed of paper-pulp made tough and waterproof by treatment, including pressure. The entire inside surface of the pipe 1 is protected by the fiber lining 2, and thus acts as an armor to keep the outside atmospheric temperature from reaching the center of the pipe or conduit and causing the gas passing therethrough to freeze.

In addition to the inside fiber lining the pipe 1 also has an outside covering or jacket 3 applied thereto, the said outer covering or jacket consisting of the same or similar material and fitting closely around and lying in contact with the outer surface of said pipe. Such outer covering is auxiliary or supplemental to the inner lining.

The fiber lining and covering or jacket are excellent non-conductors of heat and cold and effectively insulate the bore or central passage of the conduit, thus protecting the gas in its passage through the same, preventing congealment of the atmospheric moisture upon the outside of the conduit.

I claim—

A gas-conduit embodying a pipe, a fiber lining therefor, and a fiber covering or jacket around the pipe, substantially as described.

In testimony whereof I affix my signature in presence of two witnesses.

JOHN E. CARROLL.

Witnesses:
EUGENE RAYMOND, Jr.,
CHAS. E. OELSCHLAGER.